US006826695B1

(12) United States Patent
House et al.

(10) Patent No.: US 6,826,695 B1
(45) Date of Patent: *Nov. 30, 2004

(54) METHOD AND SYSTEM FOR GROUPING OF SYSTEMS IN HETEROGENEOUS COMPUTER NETWORK

(75) Inventors: Daniel Edward House, Raleigh, NC (US); Shaw-Ben Shepherd Shi, Austin, TX (US); Richard Lee Daugherty, Cary, NC (US); John Ryan McGarvey, Apex, NC (US); Chandra Paul Immanuel, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/477,767

(22) Filed: Jan. 4, 2000

(51) Int. Cl.[7] .................................................. H04L 9/32
(52) U.S. Cl. ...................................... 713/201; 709/229
(58) Field of Search .......................... 713/1, 201, 155, 713/163; 709/229; 380/279, 281, 284

(56) References Cited

U.S. PATENT DOCUMENTS

| | | | | |
|---|---|---|---|---|
| 5,218,699 A | * | 6/1993 | Brandle et al. | 709/328 |
| 5,815,665 A | * | 9/1998 | Teper et al. | 709/229 |
| 6,065,054 A | * | 5/2000 | Dutcher et al. | 709/226 |
| 6,158,010 A | * | 12/2000 | Moriconi et al. | 713/201 |
| 6,192,405 B1 | * | 2/2001 | Bunnell | 709/225 |
| 6,243,816 B1 | * | 6/2001 | Fang et al. | 713/202 |
| 6,269,405 B1 | * | 7/2001 | Dutcher et al. | 709/248 |
| 6,269,406 B1 | * | 7/2001 | Dutcher et al. | 709/248 |
| 6,732,172 B1 | * | 5/2004 | House et al. | 709/225 |

\* cited by examiner

*Primary Examiner*—Gregory Morse
*Assistant Examiner*—Andrew Nalven
(74) *Attorney, Agent, or Firm*—Sawyer Law Group LLP

(57) ABSTRACT

The present invention provides an improved method and system for unobtrusively achieving secure cross-platform access in a heterogeneous network environment. In a system aspect, the system includes a plurality of heterogeneous computer systems, at least two of the computer systems including a system specified user identification; and an enterprise directory service, the enterprise directory service being shared by the plurality of computer systems to provide for the formation of an enterprise group, the enterprise directory service including at least one enterprise user which is associated with system specified user identification from the at least two of the computer systems. The system in the network in accordance with the present invention may perform cooperative programming with other systems in the same enterprise group. Systems within the same enterprise group are allowed to define enterprise users between them. Enterprise groups establish boundaries of who can and cannot share enterprise user definitions. They also establish administrative groups of systems. They establish where trusted directory servers must, can, and cannot reside. They also establish which enterprise directory service adapter can interact, i.e., scope of impersonation. By allowing for the grouping of systems, access to systems in the network may be more readily controlled. Unnecessary or undesirable access may be minimized.

16 Claims, 5 Drawing Sheets

METHOD AND SYSTEM FOR GROUPING OF SYSTEMS IN HETEROGENEOUS COMPUTER NETWORK

FIELD OF THE INVENTION

The present invention relates to multiplatform computer system networks, and more particularly to the grouping of computer systems in the networks.

BACKGROUND OF THE INVENTION

In distributed computer networks, many operating system platforms may be employed on server and client systems within the network. Each different platform utilizes its own administrative rules for user login procedures. Thus, each platform typically has characteristic techniques for assigning user identifiers and passwords to control access to the resources and services of the system. In large, heterogeneous network environments, difficulty exists in providing user access to resources on a platform that is different than the one the user is logged into. Thus, the user is restricted from effectively and efficiently utilizing the resources of the network.

One method and system of providing a common user identify and to integrate the user's experience among different platforms without being intrusive is developed by International Business Machines Corporation™. This method and system is described in co-pending U.S. Patent Application entitled, "Method and System for a Heterogeneous Computer Network System with Unobtrusive Cross-Platform User Access", Ser. No. 09/165,368, filed on Oct. 2, 1998. In an exemplary system aspect, a plurality of computer systems are coupled in a network, each of the computer systems operating according to one of a plurality of operating system platforms. Each of the operating system platforms has an associated security mechanism. The network further includes an enterprise directory included on at least one server system of the computer systems. The Enterprise Directory is configured for security interception to allow an authorized user access among the services of the computer systems without affecting the associated security mechanisms of the operating system platforms.

Through this network, local security procedures and policies apply on each platform, thus allowing users to log-on to a single network operating system according to that system's known log-in procedures. A user object is achieved that, when spanning all systems, provides a distributed user context that is useful in unobtrusively achieving access to separate platforms. However, this network may be inefficient in that each user object has access to all systems in the network. It may be unnecessary or undesirable for a user object to have such broad access.

Difficulty also exists for user access through the Internet to large heterogeneous network environments. For example, XYZ Corporation may build a web site and provide application logic behind the web site on one system on a particular platform. The same corporation may build another web site on another system with a different platform. The web sites may not be linked to one another. The effect of the lack cooperation between XYZ Corporation's web sites is Internet user aggravation and an inability for XYZ Corporation to collect coordinated data on their Internet customers. For example, and Internet user interacts with a web application on one of the systems. This system asks the Internet user for his or her name, address, credit-card information, and many others things. The Internet user also interacts with a web application on another system. Since these systems do not share any user context information, the second system asks the Internet user to enter the same information again. The Internet user is thus aggravated, because XYZ Corporation does not behave as one comp any, making the user perform extra typing for no obvious benefit.

In addition to aggravating the Internet use r, XYZ Corporation also deprives itself of coordinated customer data across its divisions. At a minimum, coordinating customer data is difficult since XYZ Corporation will need to mine data from several sources and to cross check for duplicated customers.

Accordingly, there exists a need for an improved method and system for unobtrusively achieving secure cross-platform access in a heterogeneous network environment. The present invention addresses such a need.

SUMMARY OF THE INVENTION

The present invention provides an improved method and system for unobtrusively achieving secure cross-platform access in a heterogeneous network environment. In a system aspect, the system includes a plurality of heterogeneous computer systems, at least two of the computer systems including a system specified user identification; and an enterprise directory service, the enterprise directory service being shared by the plurality of computer systems to provide for the formation of an enterprise group, the enterprise directory service including at least one enterprise user which is associated with system specified user identification from the at least two of the computer systems. The system in the network in accordance with the present invention may perform cooperative programming with other systems in the same enterprise group. Systems within the same enterprise group are allowed to define enterprise users between them. Enterprise groups establish boundaries of who can and cannot share enterprise user definitions. They also establish administrative groups of systems. They establish where trusted directory servers must, can, and cannot reside. They also establish which enterprise directory service adapter can interact, i.e., scope of impersonation. By allowing for the grouping of systems, access to systems in the network may be more readily controlled. Unnecessary or undesirable access may be minimized.

DETAILED DESCRIPTION

The present invention provides an improved method and system for unobtrusively achieving secure cross-platform access in a heterogeneous network environment by allowing for the grouping of computer systems in the heterogeneous network environment. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus; the present invention is not intended to be limited to the embodiment shown but is to be accorded the widest scope consistent with the principles and features described herein.

The method and system in accordance with the present invention improves cross-platform access by allowing for the grouping of systems in the network. Grouped systems may perform cooperative programming among themselves.

To more particularly describe the features of the present invention, please refer to FIGS. 1 through 5 in conjunction with the discussion below.

Figure 1:
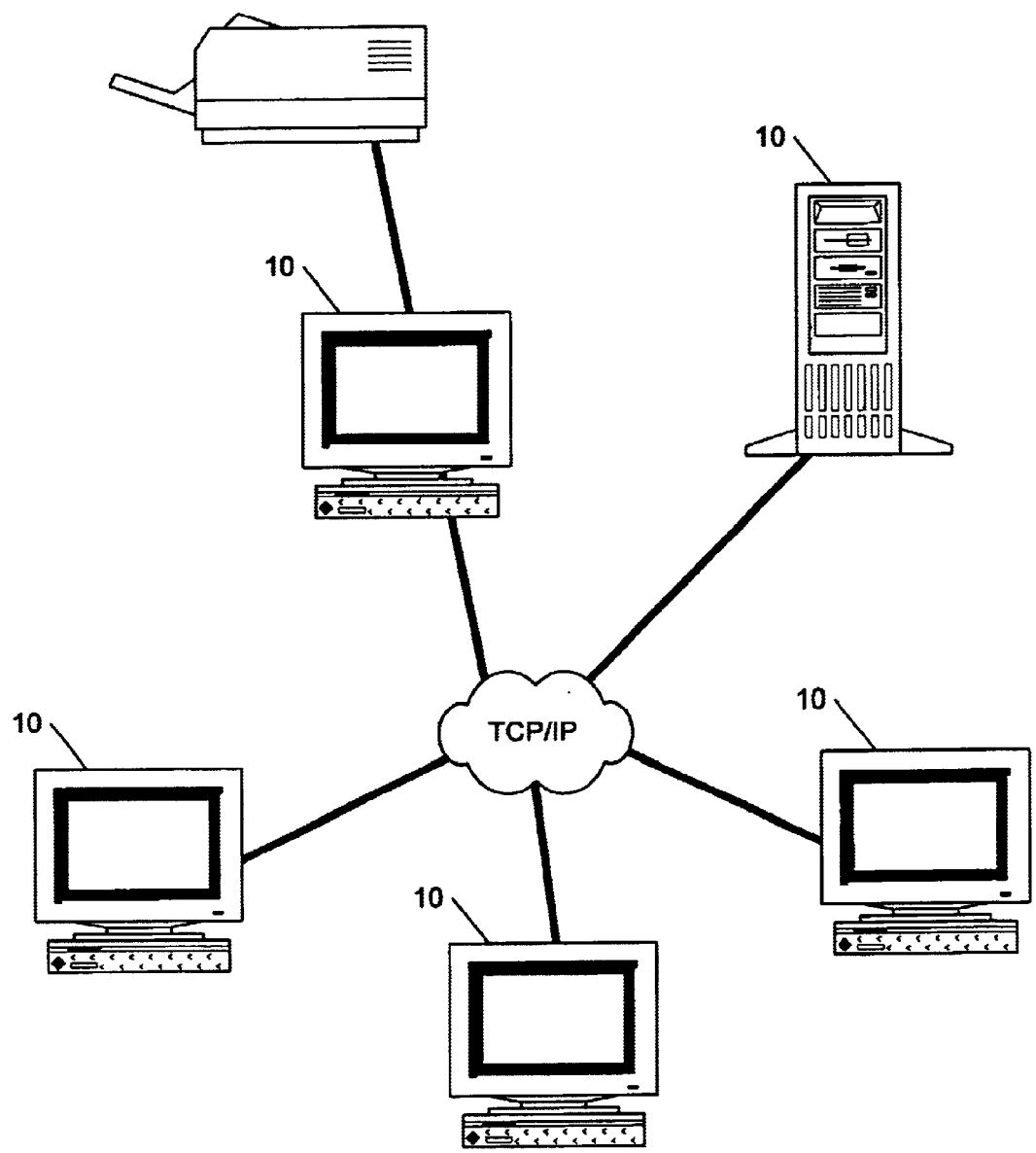
FIG. 1 illustrates a diagram representation of the heterogeneous, distributed computer network arrangement in accordance with the present invention.
Figure 2:
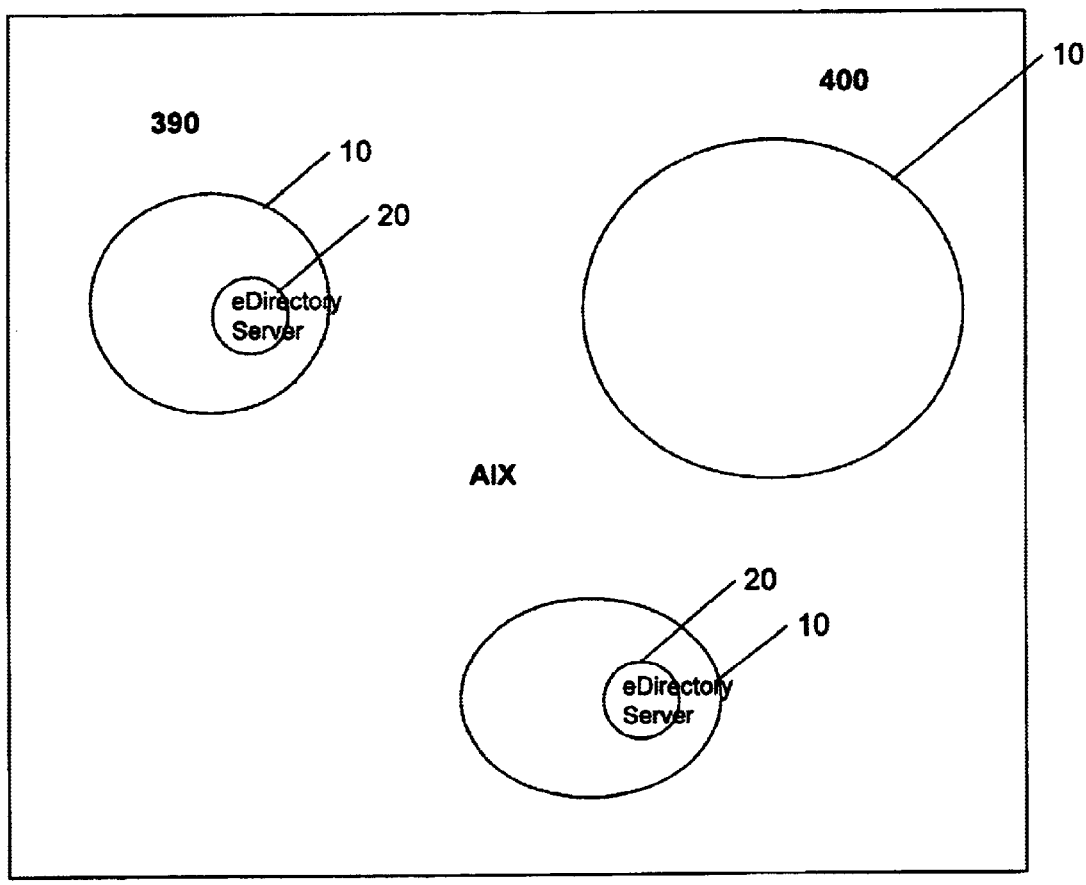
FIG. 2 illustrates a real configuration of the heterogeneous, distributed computer network in accordance with the present invention.

FIG. 1 illustrates a diagram representation of the heterogeneous, distributed computer network arrangement that includes a plurality of computer systems 10, e.g., a plurality of server and client systems, that communicate in accordance with an appropriate communication protocol, e.g., TCP/IP. As illustrated in FIG. 2, the systems 10 operate under different types of operating system platforms, such as computer systems operating under AIX, OS/390, OS/2, OS/400, VM, MVS, or NT, as is well understood by those skilled in the art. Of course, the platforms listed herein are meant as illustrated examples of suitable platforms. Other platforms may be utilized as desired for particular design needs, as is well understood by those skilled in the art. On one or more of the systems 10 has an Enterprise Directory Server 20 (eDirectory Server). Once an eDirectory Server is created on one system, that server can make replicas of directory servers on other systems.

Figure 3:
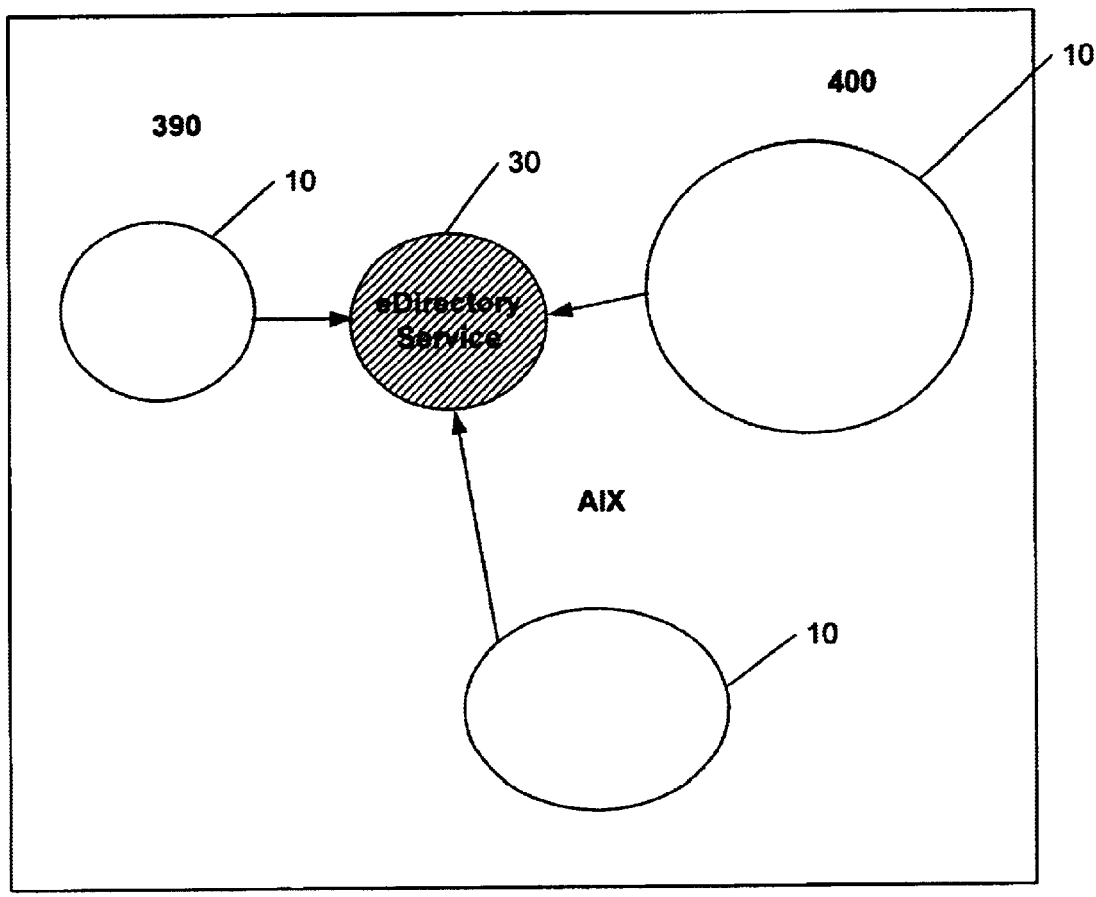
FIG. 3 illustrates a logical configuration of the heterogeneous, distributed computer network in accordance with the present invention.

FIG. 3 illustrates a logical configuration of the heterogeneous, distributed computer network in accordance with the present invention. All of the systems 10 share a common Enterprise Directory Service 30 (eDirectory Service). The eDirectory Service 30 is comprised of the one or more eDirectory Servers 20 but is independent of their specific locations. The eDirectory Service 30 comprises a plurality of user objects, referred to herein as EnterpriseUsers or eUsers, that span all platforms and exist in a directory referred to herein as eDirectory (enterprise directory). In accordance with the present invention, the platform of each system 10 includes functionality to support the distributed user context that is useful and used by all important products on each platform via the user objects. The structure for supporting the eUsers includes providing the eDirectory as a non-optional part of the software product suites in use on the computer systems, with the eDirectory being the distributed security repository for all multiplatform products, and having a minimum common schema, standard LDAP interfaces with full support for vital data ACID properties, where LDAP stands for lightweight directory access protocol, an Internet standard for directories. ACID is defined as Atomicity, Consistency, Isolation, and Durability, as is well known in the database arts. Every system further includes an eDirectory security adapter, eDSA, that intercepts security account information on each platform and populates it into the eDirectory, including removing an association for an eUser when the user identification and password becomes invalid on a platform. The eUser comprises a security context 'above' the local security context of the system. Enterprise Users and the eDirectory is further described in co-pending U.S. patent application Ser. No. 09/165,368, filed on Oct. 2, 1998. Applicants hereby incorporate this patent application by reference.

Enterprise Group

Figure 4:
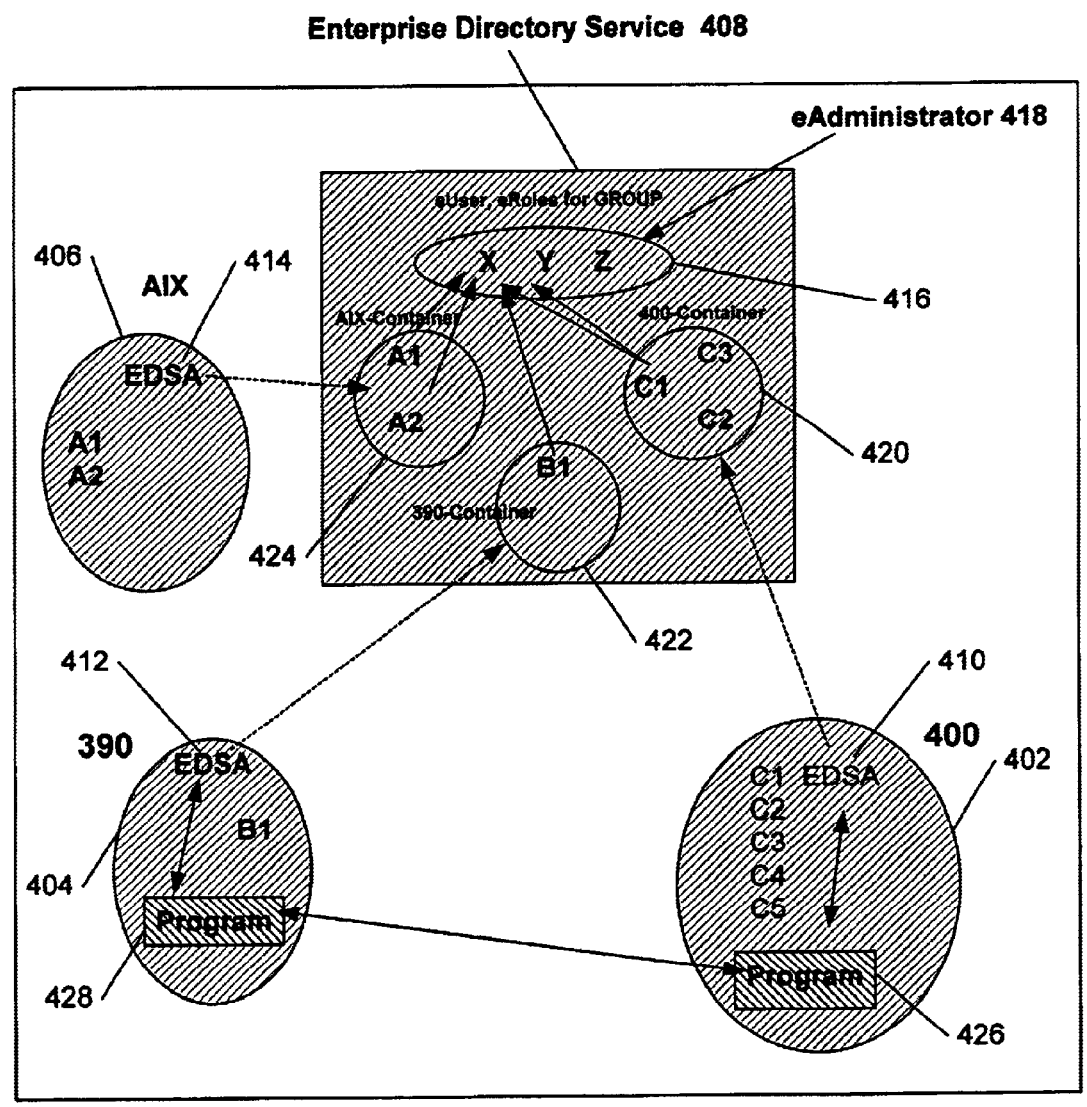
FIG. 4 illustrates a preferred embodiment of a heterogeneous network with the grouping of systems in accordance with the present invention.

FIG. 4 illustrates a preferred embodiment of a heterogeneous network with the grouping of systems in accordance with the present invention. FIG. 4 illustrates the logical layout of a plurality of heterogeneous systems 402, 404, 406 which are grouped together into an Enterprise Group, or eGroup, to share an eDirectory Service 408. The eDirectory Service 408 is accessible to each member of the eGroup. The eDirectory Servers (not shown) can be located on any member of the eGroup that is deemed suitably secure. At least one eDirectory Server must exist in the eGroup which supports the eUsers. For example, system 406 may be operating on an AIX platform; system 404 may be operating on an OS/390 platform; and system 402 may be operating an OS/400 platform. Installed on each system 402, 404, and 406 is an eDSA 410, 412, and 414, respectively. For purposes of this discussion, the group of systems will be referred to as "GROUP". In a container 416 in the eDirectory Service 408 for GROUP, eUsers X and Y are defined via the Enterprise Administrator 418 (eAdministrator). For each system 402, 404, 406, a container is defined to associate operating system (OS) specified user identification (userid) on each system with one or more eUsers. For example, containers 420, 422, and 424 are defined in the eDirectory Service 408 for systems 402, 404, and 406, respectively. OS userids A1 and A2 for system 406, B1 on system 404, and C1 on system 402 are associated with eUser X. OS userid C1 may also be associated with eUser Y.

Each eDSA 410, 412, 414 comprises Application Programming Interfaces (API) for creating and deleting objects in the containers 420, 422, 424, mapping between an OS userid and an eUser, and creating encrypted packages for use with the eGroup. The eDSA 410, 412, 414 in accordance with the present invention create opportunities for the OS to inject specific security requirements. For example, the OS decides who is authorized to call the eDSA APIs that create user objects and maps the objects to an eUser. The eDSA 410, 412, 414 also create opportunities for the OS to cache data. For example, an OS may have performance requirements that necessitate that it cache the mapping between C1 and X, so that directory access and network traffic are minimized.

To illustrate how cooperating programs on heterogeneous systems 402, 404, 406 using the eDSA and the eDirectory services to achieve cross platform cooperative programming, assume that Program 426 resides on system 402, Program 428 resides on system 404, and Program 426 is a client of Program 428. First, Program 426 is started on behalf of OS user C1. To perform a task, Program 426 needs to invoke the services of Program 428. Program 426 does not know what kind of platform is used by system 404 or anything about the users on system 404.

To invoke the services of Program 428, Program 426 invokes the eDSA 410 to package an Enterprise Request. The eDSA 410 looks in the eDirectory Service 408 and finds that C1 is associated with eUser X on system 404. The eDSA 410 then packages the request for eUser X. The package returned is cryptographically secure. That is, the package can be sent only to another system in GROUP (all systems in GROUP are within the same Kerberos realm, for example) and is targeted to a specific system within GROUP. Either the entire request may be encrypted, or only a token representing X. The encrypted package is returned to Program 426. Program 426 then forwards the package to Program 428.

Program 428 invokes the eDSA 412 of system 404 to decrypt the package. The eDSA 412 looks in the eDirectory Service 408 and finds that eUserX is associated with userid B1 for system 404. The eDSA 412 returns the results. It may be the entire package decrypted (if it all was encrypted on the way over), or it may be only userid B1 as a special token. The special B1 token is used by Program 428 in an API call to its operating system. This API is to "impersonate" B1. That is, Program 428 will begin to run under the context of userid B1. Program 428 does the work requested while running under the context of B1. When it is finished, Program 428 will "revert" and no longer impersonate B1.

Program 428 returns the results to Program 426. Optionally, Program 428 could call the eDSA 412 to encrypt the return package similarly to the way Program 426 encrypted the results. This optional step would be so that Program 426 can be assured it is receiving results only from a valid member of the eGroup called GROUP.

In the manner illustrated in FIG. 4, a system in a heterogeneous network may perform cooperative programming with other systems in the same eGroup. Systems within the same eGroup are allowed to define eUsers between them. Enterprise Groups establish boundaries of who can and cannot share eUser definitions. They also establish administrative groups of systems. They establish where trusted directory servers must, can, and cannot reside. They also establish which eDSAs can interact, i.e., scope of impersonation.

A network may establish multiple eGroups. Groups of eGroups may also be established without departing from the spirit and scope of the present invention, where relationships between the eGroups are such that trust can be set up between the eGroups. When two eGroups have a trust relationship, an eUser that is authenticated or set within one eGroup can be trusted and used in another eGroup.

By allowing for the grouping of systems in this manner, access to systems in the network may be more readily controlled. Unnecessary or undesirable access may be minimized.

Internet Personalization

Internet Personalization can be achieved using the same logical layout as illustrated in FIG. 4 except at least one of the systems 402–406 may be a web server and an application server. Instead of defining eUsers, Enterprise Roles (eRoles), are defined in the container 416 of the eDirectory service 408. Enterprise Roles are identities stored in the eDirectory service 408 in a similar manner as eUsers, however, an eRole may be used independently of any specific operating system userid.

Figure 5:
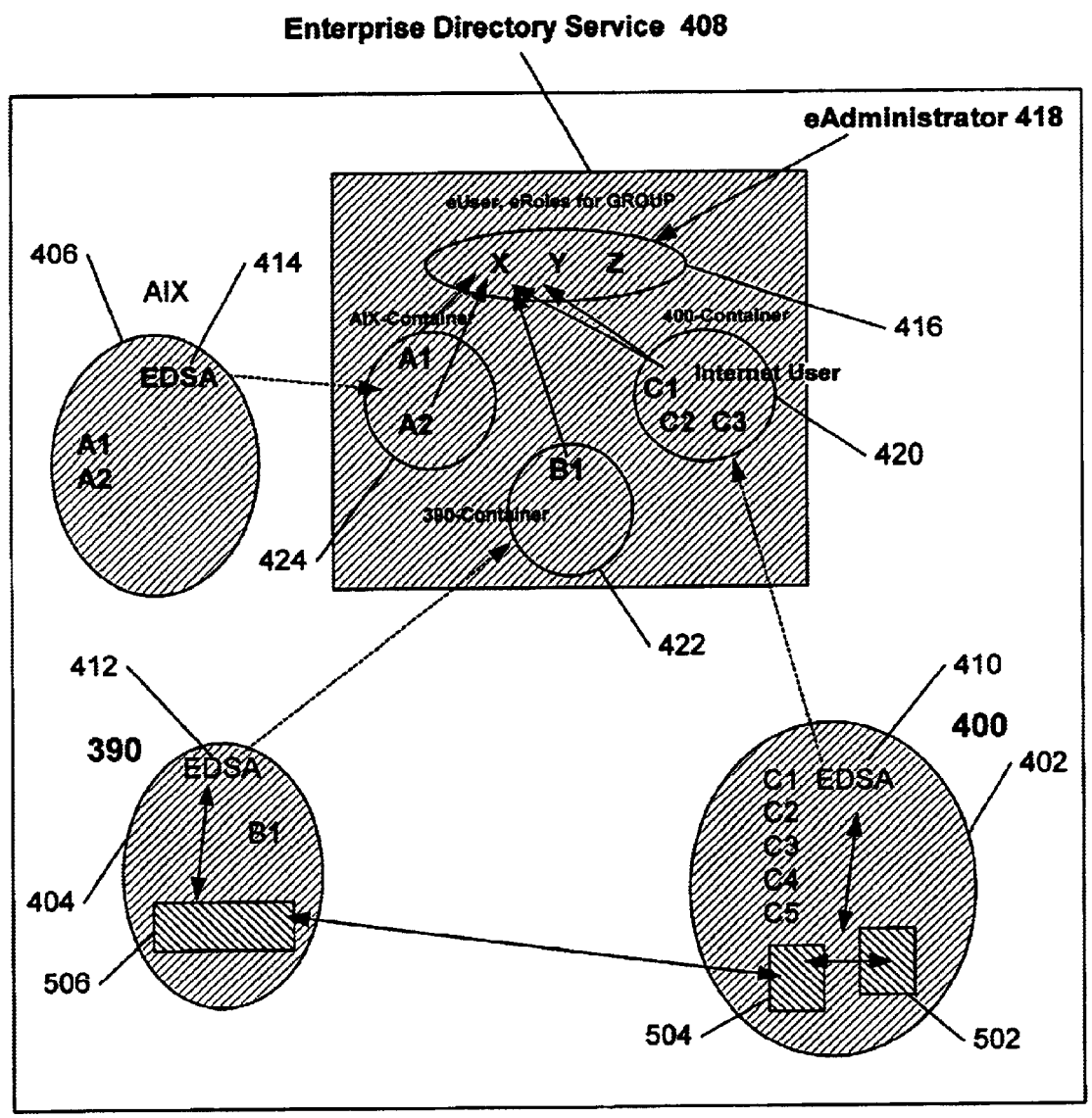
FIG. 5 illustrates a preferred embodiment of a heterogeneous network with Internet personalization in accordance with the present invention.

FIG. 5 illustrates a preferred embodiment of a heterogeneous network with Internet personalization in accordance with the present invention. In this layout, system 402 comprises a web server 502 and a web application server 504. System 404 comprises a Program 506 which may be invoked by the web application server 504, which may be invoked by the web server 502. An eRole, Z, is defined on the eDirectory service 408. An Internet user represented by a customer identifier is associated with eRole Z. First, a request arrives at the web server 502 from a web browser located somewhere in the Internet. The usual steps of securing communication between the web server 302 and the web browser apply, such as using Secure Socket Layer (SSL). The browser determines that the request should be handled by web application server 504. The web application server 504 determines that this request is, for example, a customer using a web store front. This customer has an identity represented by a customer number. The web application server 504 needs other programs, such as Program 506, to do work for it (such as a database, a transaction processing system, a file system, or even the directory service). Since the Internet user is associated with eRole Z, the eDSA 410 packages an Enterprise Request for eRole Z. The request is then processed in the same manner as with eUsers, as described above, except instead of impersonating an eUser, a token for eRole Z is used to make authorization decisions. Programs such as Program 506 are assured of the validity of requests, because all of the encryption services are secure within the eGroup using well known techniques.

For example, assume that eRole Z is named "WebBookBuyingCustomer." The WebBookBuyingCustomer identity can be used by servers to authorize work. For example, the web application server 504 might authorize any requests in the eRole WebBookBuyingCustomer to create a customer account and order books. The web application server 504 might pool database connections pre-authorized to create orders and use any available connection for any request associated with a WebBookBuyingCustomer. The web application server 504 might keep a different database connection associated with WebBookStoreManager, another eRole, and this connection can be used to create new book objects in the online store (and in the database).

In the manner illustrated in FIG. 5, Internet users are provided cross-platform access in a heterogeneous network environment. By allowing eRoles to be defined independently of any specific OS userid, flexibility is injected into the network configuration and Internet user aggravation is reduced.

Although Internet personalization is described above in the context of eGroups, one of ordinary skill in the art will understand that eRoles and Internet personalization may be provided outside the context of eGroups without departing from the spirit and scope of the present invention.

Set Up of Enterprise Group and Enterprise Roles

In the preferred embodiment, the following steps may be used to set up an Enterprise Group, and to define Enterprise Roles. The set up process begins with one system, such as system 402 (FIG. 4). An administrator (not shown) on system 402 installs the eDSA 410. The eDSA 410 installs the directory server, if there isn't one already. This administrator, since he is first, becomes the eAdministrator 418. The eAdministrator 418 configures the eDSA 410/Enterprise Directory Service 408 to hold one eGroup called GROUP.

There is now an eGroup called GROUP consisting of one system 402. The eAdministrator 418 can now create a container 416 in the eDirectory service 408 and define in it eUser objects, such as X and Y. It may also define eRoles, such as Z.

The administrator on system 402 can now use an administrative tool (not shown), such as a Graphical User Interface (GUI), to create new user objects in the container 420 and associate these objects to pre-defined eUser objects.

The eAdministrator 408 allows systems 404 and 406 to join the eGroup called GROUP by creating the container 422 for system 404 and container 424 for system 406, and by creating identities for the eDSAs 412 and 414.

An administrator (not shown) on system 404 installs the eDSA 412 and configures it. As part of the eDSA 412 configuration, the administrator is asked if he wants to join an eGroup. The administrator responds "yes" and identifies the group by identifying a system on which an eDirectory Server is running. For GROUP, this is system 402 since it is currently the only member of GROUP. The eDSA 412 attempts to connect to the eDirectory Service 408. The eDirectory Service 408 asks the administrator for system 404 for the credentials which were created when container 422 was created. If the administrator for system 404 supplies the credentials correctly, system 404 will join GROUP. The administrator for system 404, using an administrative tool, can now create user objects in container 422 and associate them with eUser objects. The same steps are performed for system 406 to join GROUP.

At any point, the eAdministrator 418 can delegate authority to others to perform eAdministrator duties, such as creating eUser objects in the GROUP container 416. At any point, the eAdministrator 418 can create eRole objects (e.g., eRole Z in FIGS. 4 and 5).

An additional advantage may be gained by requiring eAdministrator actions, such as creating new eUsers, to go through an eDSA layer. That is, the tool used by the eAdministrator 418 may use eDSA API services that only he is authorized to use.

An improved method and system for unobtrusively achieving secure cross-platform access in a heterogeneous network environment has been disclosed. The system in the network in accordance with the present invention may perform cooperative programming with other systems in the same eGroup. Systems within the same eGroup are allowed to define eUsers between them. Enterprise Groups establish boundaries of who can and cannot share eUser definitions. They also establish administrative groups of systems. They establish where trusted directory servers must, can, and cannot reside. They also establish which eDSAs can interact, i.e., scope of impersonation. By allowing for the grouping of systems, access to systems in the network may be more readily controlled. Unnecessary or undesirable access may be minimized.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system for enabling cooperative processing in a heterogeneous computer network, comprising:
    a plurality of heterogeneous computer systems, comprising a first computer systems including a first system specified user identification and a second computer system including a second system specified user identification; and
    an enterprise directory service, the enterprise directory service being shared by the plurality of computer systems to provide for the formation of an enterprise group, the enterprise directory service including at least one enterprise user wherein both the first and second system specified user identification are associated with the at least one enterprise user, wherein the first computer system invokes a request to the second computer system utilizing the first system specified user identification, wherein the request is packaged for the at least one enterprise user and sent to the second computer system, wherein the second computer system services the request as if invoked by the second system specified user identification.

2. The system of claim 1, wherein each of the computer systems comprises an enterprise directory service adapter (eDSA).

3. The system of claim 1, wherein the eDSA comprises at least one of a plurality of Application Programming Interfaces (API) for:
    creating and deleting an enterprise user in a container in the enterprise directory service;
    mapping between a system specified user identification and the enterprise user; and
    creating encrypted packages for use between at least two computer systems in the enterprise group.

4. The system of claim 1, wherein the enterprise directory service further comprises a container, the container comprising the at least one enterprise user.

5. The system of claim 1, wherein the enterprise directory service further comprises an enterprise administrator, the enterprise administrator capable of performing at least one of the following functions:
    creating the enterprise group;
    defining one or more enterprise users for the enterprise group;
    creating a container for the enterprise group, the container comprising the enterprise users; and
    creating an identity for an eDSA for each of the plurality of computer systems.

6. A method for enabling cooperative processing in a heterogeneous computer network, the network including a plurality of computers systems, comprising the steps of:
    (a) administering a first of the plurality of computer systems operating under a first operating system platform through a first eDSA, the first computer system including a first system specified user identification;
    (b) administering a second of the plurality of computer systems operating under a second operating system platform through a second eDSA, the second computer system including a second system specified user identification;
    (c) configuring an enterprise directory service to be shared by the first and second computer systems for the formation of an enterprise group, the enterprise directory service including at least one enterprise user which is associated with the first and second system specified user identification;
    (d) invoking a request by the first system specified user identification on the first computer system to be serviced on the second computer system;
    (e) sending the request packaged for the at least one enterprise user to the second computer system; and
    (f) servicing the request by the second computer system as if invoked by the second system specified user identification.

7. The method of claim 6, wherein the configuring step (c) comprises:
    (c1) creating a container in the enterprise directory service, the container comprising the at least one enterprise user; and
    (c2) creating an enterprise administrator.

8. The method of claim 7, wherein the enterprise administrator is capable of performing at least one of the following functions:
    creating the enterprise group;
    defining one or more enterprise users for the enterprise group;
    creating a container for the enterprise group, the container comprising the enterprise users; and
    creating identities for the first and second eDSAs.

9. The method of claim 6, wherein the invoking step (d) comprises:
    (d1) invoking the request by the first system specified user identification on the first computer system to be serviced on the second computer system;

(d2) determining by the first eDSA that the first system specified user identification is associated with the at least one enterprise user;

(d3) packaging the request by the first eDSA as being invoked by the at least one enterprise user; and (d4) forwarding the packaged request to the second computer system.

10. A method for enabling cooperative processing in a heterogeneous computer network, the network including a plurality of computer systems, comprising the steps of:

(a) administering a first of the plurality of computer systems operating under a first operating system platform through a first eDSA, the first computer system including a first system specified user identification;

(b) administering a second of the plurality of computer systems operating under a second operating system platform through a second eDSA, the second computer system including a second system specified user identification;

(c) configuring an enterprise directory service to be shared by the first and second computer systems for the formation of an enterprise group, the enterprise directory service including at least one enterprise user which is associated with the first and second system specified user identification;

(d) invoking a request by the first system specified user identification on the first computer system to be serviced on the second computer system;

(e) servicing the request by the second system specified user identification on the second computer system, wherein the servicing comprises:

(e1) receiving the request from the first computer system by the second computer system, the request being packaged for the at least one enterprise user;

(e2) determining by the second eDSA that the at least one enterprise user is associated with the second system specified user identification for the second computer system; and (e3) servicing the request by the second computer system as if invoked by the second system specified user identification; and (f) returning a result from the second computer system to the first computer system.

11. A computer readable medium with program instructions for enabling cooperative processing in a heterogeneous computer network, the network including a plurality of computers systems, the instructions for:

(a) administering a first of the plurality of computer systems operating under a first operating system platform through a first eDSA, the first computer system including a first system specified user identification;

(b) administering a second of the plurality of computer systems operating under a second operating system platform through a second eDSA, the second computer system including a second system specified user identification;

(c) configuring an enterprise directory service to be shared by the first and second computer systems for the formation of an enterprise group, the enterprise directory service including at least one enterprise user which is associated with the first and second system specified user identification;

(d) invoking a request by the first system specified user identification on the first computer system to be serviced on the second computer system;

(e) sending the request packaged for the at least one enterprise user to the second computer system; and (f) servicing the request by the second computer system as if invoked by the second system specified user identification.

12. The medium of claim 11, wherein the configuring instruction (c) comprises instructions for:

(c1) creating a container in the enterprise directory service, the container comprising the at least one enterprise user; and (c2) creating an enterprise administrator.

13. The medium of claim 11, wherein the invoking instruction (d) comprises instructions for:

(d1) invoking the request by the first system specified user identification on the first computer system to be serviced on the second computer system;

(d2) determining by the first eDSA that the first system specified user identification is associated with the at least one enterprise user;

(d3) packaging the request by the first eDSA as being invoked by the at least one enterprise user; and (d4) forwarding the packaged request to the second computer system.

14. A computer readable medium with program instructions for enabling cooperative processing in a heterogeneous computer network, the network including a plurality of computer systems, comprising the instructions for:

(a) administering a first of the plurality of computer systems operating under a first operating system platform through a first eDSA, the first computer system including a first system specified user identification;

(b) administering a second of the plurality of computer systems operating under a second operating system platform through a second eDSA, the second computer system including a second system specified user identification;

(c) configuring an enterprise directory service to be shared by the first and second computer systems for the formation of an enterprise group, the enterprise directory service including at least one enterprise user which is associated with the first and second system specified user identification;

(d) invoking a request by the first system specified user identification on the first computer system to be serviced on the second computer system;

(e) servicing the request by the second system specified user identification on the second computer system, wherein the servicing comprises:

(e1) receiving the request from the first computer system by the second computer system, the request being packaged for the at least one enterprise user;

(e2) determining by the second eDSA that the at least one enterprise user is associated with the second system specified user identification for the second computer system; and (e3) servicing the request by the second computer system as if invoked by the second system specified user identification; and (f) returning a result from the second computer system to the first computer system.

15. A method for cooperative processing in a heterogeneous computer network, the network including a plurality of computers systems, comprising the steps of:

(a) invoking a request by a first system specified user identification on a first of the plurality of computer systems to be serviced on a second of the plurality of computer systems;

(b) determining by a first eDSA on the first computer system that the first system specified user identification is associated with an enterprise user, the enterprise user being defined in an enterprise directory service shared by the first and second computer systems for the formation of an enterprise group;

(c) packaging the request by the first eDSA as being invoked by the enterprise user;

(d) forwarding the packaged request to the second computer system;

(e) determining by a second eDSA on the second computer system that the enterprise user is associated with a second system specified user identification for the second computer system; and (f) servicing the packaged request by the second computer system as if invoked by the second system specified user identification.

16. A computer readable medium with program instructions for cooperative processing in a heterogeneous computer network, the network including a plurality of computers systems, the instructions for:

(a) invoking a request by a first system specified user identification on a first of the plurality of computer systems to be serviced on a second of the plurality of computer systems;

(b) determining by the a first eDSA on the first computer system that the first system specified user identification is associated with an enterprise user, the enterprise user being defined in an enterprise directory service shared by the first and second computer systems for the formation of an enterprise group;

(c) packaging the request by the first eDSA as being invoked by the enterprise user;

(d) forwarding the packaged request to the second computer system;

(e) determining by a second eDSA on the second computer system that the enterprise user is associated with a second system specified user identification for the second computer system; and (f) servicing the packaged request by the second computer system as if invoked by the second system specified user identification.

* * * * *